(12) United States Patent
Tunali et al.

(10) Patent No.: US 9,973,363 B1
(45) Date of Patent: May 15, 2018

(54) GENERALIZED FREQUENCY DIVISION MULTIPLEXING (GFDM) MULTIPLE-INPUT MULTIPLE-OUTPUT (MIMO) SYSTEM

(71) Applicant: Xilinx, Inc., San Jose, CA (US)

(72) Inventors: Nihat E. Tunali, Campbell, CA (US); Michael Wu, Palo Alto, CA (US); Christopher H. Dick, San Jose, CA (US)

(73) Assignee: XILINX, INC., San Jose, CA (US)

( * ) Notice: Subject to any disclaimer, the term of this patent is extended or adjusted under 35 U.S.C. 154(b) by 77 days.

(21) Appl. No.: 15/160,998

(22) Filed: May 20, 2016

(51) Int. Cl.
*H04L 27/01* (2006.01)
*H04L 27/26* (2006.01)
*H04J 4/00* (2006.01)
*H04J 1/04* (2006.01)
*H04B 7/0491* (2017.01)

(52) U.S. Cl.
CPC ....... *H04L 27/2627* (2013.01); *H04B 7/0491* (2013.01); *H04J 1/045* (2013.01); *H04J 4/005* (2013.01); *H04L 27/01* (2013.01); *H04L 27/265* (2013.01)

(58) Field of Classification Search
CPC .............................. H04L 27/01; H04L 27/265
See application file for complete search history.

(56) References Cited

U.S. PATENT DOCUMENTS

| | | | |
|---|---|---|---|
| 2003/0045318 A1* | 3/2003 | Subrahmanya | H04W 52/40 455/522 |
| 2005/0068886 A1* | 3/2005 | Wang | H04L 27/2607 370/210 |
| 2009/0161749 A1* | 6/2009 | Nangia | H04L 5/0007 375/233 |
| 2010/0220708 A1* | 9/2010 | Mantravadi | H04B 7/0669 370/343 |
| 2012/0159122 A1 | 6/2012 | Anderson et al. | |
| 2016/0197758 A1* | 7/2016 | Lin | H04L 27/2627 370/210 |

OTHER PUBLICATIONS

3rd Generation Partnership Project; Technical Specification Group Radio Access Network; Evolved Universal Terrestrial Radio Access (E-UTRA): Multiplexing and Channel Coding (Release 9) 3GPP Organizational Partners TS 36.212 Rev. 8.3.0, May 2008.
M. Bellanger, D. LeRuyet, D. Roviras, M. Terré, J. Nossek, L. Baltar, Q. Bai, D. Waldhauser, M. Renfors, T. Ihalainen et al., "FBMC Physical Layer: a Primer," Jan. 2010. [Online]. Available: http://www.ict-phydyas.org.
A. Farhang, N. Marchetti, and L.E. Doyle, "Low Complexity Transceiver Design for GFDM," arXiv preprint, Jan. 2015 [Online]. Available http://arxiv.org/abs/1501.02940.

(Continued)

*Primary Examiner* — Gbemileke J Onamuti
(74) *Attorney, Agent, or Firm* — David O'Brien; Hong Shi

(57) ABSTRACT

A method includes receiving frequency domain (FD) symbols associated with data symbols transmitted in a channel on a frame including a plurality of subcarriers and a plurality of time-slots. An equalization process is performed to the received FD symbols to generate FD equalized symbols. The FD equalized symbols is transformed to time domain (TD) symbols. A demodulation process is performed to the TD symbols to provide estimates of the data symbols.

20 Claims, 7 Drawing Sheets

(56) References Cited

OTHER PUBLICATIONS

I. Gaspar, M. Matthé, N. Michailow, L.L. Mendes, D. Zhang, and G. Fettweis, "GFDM Transceiver Using Precoded Data and Low-Complexity Multiplication in Time Domain," arXiv Preprint, Jun. 2015. [Online]. Available: http://arxiv.org/abs/1506.03350.
L. Hentilä, P. Kyösti, M. Käske, M. Narandzic, and M. Alatossava, Matlab Implementation of the Winner Phase 11 Channel Model ver 1.1, Dec. 2007. [Online]. Available: https://www.ist-winner.org/phase_2_model.html.
Y. Hu, Z. Wang, X. Gaol, and J. Ning, "Low-complexity Signal Detection Using CG Method for Upling Large-Scale MIMO Systems," in Proc. IEEE ICCS, Nov. 2014, pp. 477-481.
W. Jiang and M. Schellmann, "Suppressing the Out-of-Band Power Radiation in Multi-carrier Systems: A Comparative Study," in IEEE Globecom, Oct. 2012, pp. 1477-1482.
Z. Kollar, L. Vargo, N. Michailow, B. Horvath, P. Bakki, and J. Bito, "Evaluation of Clipping Based Iterative PAPR Reduction Techniques for FBMC Systems," The Scientific World Journal, vol. 2014, Jan. 2014.
E. Larsson, O. Edfors, F. Tufvesson, and T. Marzetta, "Massive MIMO for Next Generation Wireless Systems," IEEE Commun. Mag., vol. 52, No. 2, pp. 186-195, Feb. 2014.
T.L. Marzetta, "Noncooperative Cellular Wireless With Unlimited Numbers of Base Station Antennas", IEEE Trans. Wireless Commun., vol. 9, No. 11, pp. 3590-3600, Nov. 2010.
N. Michailow, S. Krone, M. Lentmaier, and G. Fettweis, "Bit Error Rate Performance of Generalized Frequency Division Multiplexing," in IEEE Vehicular Technology Conference, Sep. 2012.
N. Michailow and G. Fettweis, "Low Peak-to-Average Power Ratio for Next Generation Cellular Systems, with Generalized Frequency Division Multiplexing," in Intl. Symposium on Intelligent Signal Processing and communications Systems (ISPACS), Nov. 2013, pp. 651-655.
J. Nadal, C.A. Nour, A. Baghdadi, and H. Lin, "Hardware Prototyping of FBMC/OQAM Baseband for 5G Mobile Communication Systems," in IEEE Intl. Symposium on Rapid System Prototyping, Jul. 2014, pp. 135-141.
H. Prabhu, J. Rodrigues, O. Edfors, and F. Rusek, "Approximative Matrix Inverse Computations for Very-Large MIMO and Applications to Linear Pre-Coding Systems," in Proc. IEEE WCNC, Apr. 10, 2013, pp. 2710-2715.
F. Rusek, D. Persson, B.K.Lau, E.G. Larsson, T.I. Marzetta, O. Edfors, and F. Tufvesson, "Scaling Up MIMO: Opportunities and Challenges with Very Large Arrays," IEEE Signal Process. Mag., vol. 30, No. 1, pp. 40-60, Jan. 2013.
L. Sendrei, S. Marchevsky, M. Lentmaier, and G. Fettweis, "Iterative Receiver for Clipped GFDM Signals," in 24th Intl. Conference Radioelektronika (Radioelektronika), Apr. 15-16, 2014.
S. Sesia, I. Toufik, and M. Baker, LTD, The UMTS Long Term Evolution From Theory to Practice, Wiley Publishing 2009.
P. Siohan, C. Siclet, and N. Lacaille, "Analysis and Design of OFDM/OQAM Systems based on Filterbank Theory," IEEE Transactions on Signal Processing, vol. 50, No. 5, pp. 1170-1183, May 2002.
C. Studer, S. Fatch, and D. Seethaler, "ASIC Implementation of Soft-Input Soft-Output MIMO Detection Using MMSE Parallel Interference Cancellation," IEEE J. Solid-State Circuits, vol. 46, No. 7, pp. 1754-1765, Jul. 2011.
N. E. Tunali, M.Wu, C. Dick, and C. Studer. "Linear Large-Scale MIMO Data Detection for 5G Multi-Carrier Waveform Candidates," Asilomar Conference on Signals, Systems, and Computers, 5 pgs., 2015.
A.B. Ucuncu and A.O. Yilmaz, "Out-of-Band Radiation Comparison of GFDM, WCP-COQAM and OFDM at Equal Spectral Efficiency," arXiv Preprint, Oct. 2015. (Online). Available: http://arxiv.org/abs/1510.01201.
A. Viholainen, T.Ihalainen, T.H. Stitz, M. Renjorst, and M. Bellanger, "Prototype Filter Design for Filter Bank Based Multicarrier Transmission," in European Signal Processing Conference, Aug. 2009, pp. 1359-1363.
S.J. Wright, "Coordinate Descent Algorithms," Mathematical Programming, vol. 151, No. 1, pp. 3-34, Jun. 2015.
M. Wu, C. Dick, J. R. Cavallaro, and C. Studer. "FPGA Design of a Coordinate Descent Data Detector for Large-Scale MU-MIMO," IEEE International Symposium on Circuits and Systems (ISCAS), 4 pgs., 2016.
M. Wu, B. Yin, G. Wang, C. Dick, J.R. Cavallaro, and C. Studer, "Large-Scale MIMO Detection for 3GPP LTE: Algorithms and FPGA Implementations," IEEE J. Sel Topics in Sig. Proc., vol. 8, No. 5, pp. 916-929, Oct. 2014.
B. Yin, M. Wu, J.R. Cavallaro, and C. Studer, "Conjugate Gradient-Based Soft-Output Detection and Precoding in Massive MIMO Systems," in Proc. IEEE Globecom, Dec. 2014, pp. 4287-4292.
B. Yin, M. Wu, G. Wang, C. Dick, J.R. Cavallaro, and C. Studer, "A 3.8 Gb/s Large-Scale MIMO Detector for 3GPP LTE-Advanced," in Proc. IEEE ICASSP, May 2014, pp. 3907-3911.
B. Yin, M. Wu, J. Cavallaro, and C. Studer, "VLSI Design of Large-Scale Soft-Output MIMO Detection Using Conjugate Gradients," in Proc. IEEE ISCAS, May 2015, pp. 1498-1501.

\* cited by examiner

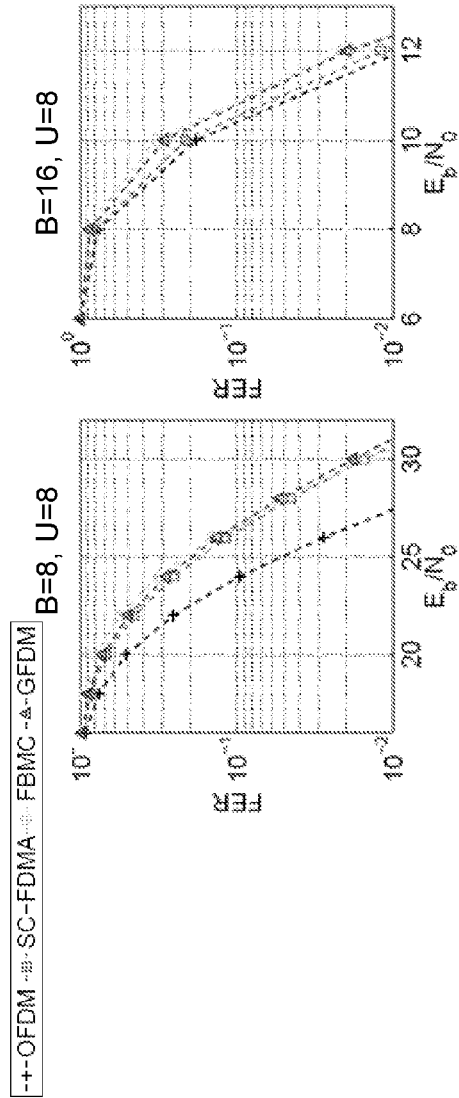
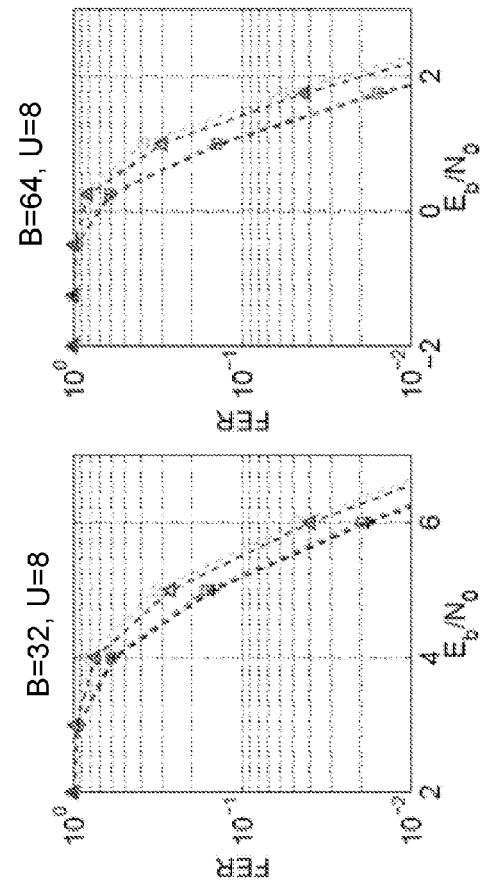
FIG. 7A
FIG. 7B
FIG. 7C
FIG. 7D

US 9,973,363 B1

GENERALIZED FREQUENCY DIVISION MULTIPLEXING (GFDM) MULTIPLE-INPUT MULTIPLE-OUTPUT (MIMO) SYSTEM

FIELD

Examples of the present disclosure generally relate to integrated circuits ("ICs") and, in particular, to an embodiment related to data detection in a generalized frequency division multiplexing ("GFDM") multiple-input, multiple-output ("MIMO") system.

BACKGROUND

MIMO operation in combination with spatial multiplexing is used in various wireless standards, such as IEEE 802.11n, IEEE 802.11 ac, Evolved High-Speed Packet Access (HSPA+), Worldwide Interoperability for Microwave Access (WiMAX), and Long Term Evolution (LTE) for example. In MIMO systems, multiple spatially separated users may be concurrently serviced, and multiple data streams may be concurrently transmitted in the same frequency band. However, conventional MIMO systems have ever-increasing demands on throughput, and limits on the throughput of such MIMO systems are quickly approaching due to such increasing demand. Furthermore, there is more competition for frequency bands for wireless communication.

Accordingly, it would be desirable and useful to provide a transmission and/or a reception technology that facilitates meeting a growing demand for higher throughput without a further increase in the communication bandwidth.

SUMMARY

In some embodiments in accordance with the present disclosure, a method includes receiving frequency domain (FD) symbols associated with data symbols transmitted in a channel on a frame including a plurality of subcarriers and a plurality of time-slots; performing an equalization process to the received FD symbols to generate FD equalized symbols; transforming the FD equalized symbols to time domain (TD) symbols; and performing a demodulation process to the TD symbols to provide estimates of the data symbols.

In some embodiments, the performing the demodulation process includes: generating a plurality of first subcarrier symbol vectors associated with the plurality of subcarriers respectively from the TD symbols; obtaining a plurality of second subcarrier symbol vectors by circularly convolving each of the plurality of first subcarrier symbol vectors with a subcarrier filter; generating a plurality of time-slot symbol vectors associated with the plurality of time-slots respectively using the plurality of second subcarrier symbol vectors; and performing an inverse discrete Fourier transform to each time-slot symbol vector to provide estimates of the data symbols.

In some embodiments, the generating the plurality of time-slot symbol vectors includes: generating a first matrix, where each of the plurality of second subcarrier symbol vectors is a column vector of the first matrix; generating a second matrix by transposing the first matrix; and providing column vectors of the second matrix as the plurality of time-slot symbol vectors associated with the plurality of time-slots respectively.

In some embodiments, the equalization process includes a minimum mean-square error (MMSE) equalization process.

In some embodiments, the performing the demodulation process includes performing a zero-forcing (ZF) equalization process.

In some embodiments, the method includes computing a noise plus interference (NPI) variance resulting from the equalization process and the demodulation process; and generating a soft-output signal using the NPI variance and the estimates of the data symbols.

In some embodiments, the soft-output signal includes log-likelihood ratio (LLR) values.

In some embodiments, the computing the NPI variance includes: obtaining a first NPI variance resulting from the equalization process; and multiplying a demodulation NPI variance term retrieved from a memory and the first NPI variance to provide the NPI variance.

In some embodiments, the method includes performing a generalized frequency division multiplexing (GFDM) modulation process to the data symbols to generate a GFDM signal for transmission in the channel, wherein a transmit filter is applied for each subcarrier using circular convolution.

In some embodiments, the demodulation NPI variance term is expressible as:

$$\frac{1}{KM}\sum_{k=0}^{K-1}\sum_{m=0}^{M-1}|\tilde{g}_{k,m}|^2,$$

wherein K represents a first number of the plurality of subcarriers, wherein M represents a second number of the plurality of time-slots, wherein $\tilde{g}_{k,m}$ is chosen such that:

$$F_M \tilde{g}_{k,m} = 1/F_M g_{k,m},$$

wherein $F_M$ is an M×M normalized discrete Fourier transform (DFT) matrix, and wherein $g_{k,m}$ is a component of the transmit filter.

In some embodiments in accordance with the present disclosure, a system includes an integrated circuit configured to: receive frequency domain (FD) symbols associated with data symbols transmitted in a channel on a frame including a plurality of subcarriers and a plurality of time-slots; perform an equalization process to the received FD symbols to generate FD equalized symbols; transform the FD equalized symbols to time domain (TD) symbols; and perform a demodulation process to the TD symbols to provide estimates of the data symbols.

In some embodiments, to perform the demodulation process on the TD symbols, the integrated circuit is configured to: generate a plurality of first subcarrier symbol vectors associated with the plurality of subcarriers respectively from the TD symbols; obtain a plurality of second subcarrier symbol vectors by circularly convolving each of the plurality of first subcarrier symbol vectors with a subcarrier filter; generate a plurality of time-slot symbol vectors associated with the plurality of time-slots respectively using the plurality of second subcarrier symbol vectors; and perform an inverse discrete Fourier transform to each time-slot symbol vector to provide estimates of the data symbols.

In some embodiments, to generate the plurality of time-slot symbol vectors, the integrated circuit is configured to: generate a first matrix, where each of the plurality of second subcarrier symbol vectors is a column vector of the first matrix; generate a second matrix by transposing the first matrix; and provide column vectors of the second matrix as the plurality of time-slot symbol vectors associated with the plurality of time-slots respectively.

In some embodiments, the integrated circuit is configured to: compute a noise plus interference (NPI) variance resulting from the equalization process and the demodulation process; and generate a soft-output signal using the NPI variance and the estimates of the data symbols.

In some embodiments, to compute the NPI variance, the integrated circuit is configured to: obtain a first NPI variance resulting from the equalization process; and multiply a demodulation NPI variance term retrieved from a memory and the first NPI variance to provide the NPI variance.

In some embodiments, the system includes a generalized frequency division multiplexing (GFDM) modulator configured to modulate the data symbols to generate a GFDM signal for transmission in the channel, wherein a transmit filter is applied for each subcarrier using circular convolution.

Other aspects and features will be evident from reading the following detailed description and accompanying drawings.

BRIEF DESCRIPTION OF THE DRAWINGS

FIGS. 7A, 7B, 7C, and 7D illustrate performance comparison between various embodiments according to the present disclosure.

DETAILED DESCRIPTION

Figure 1:
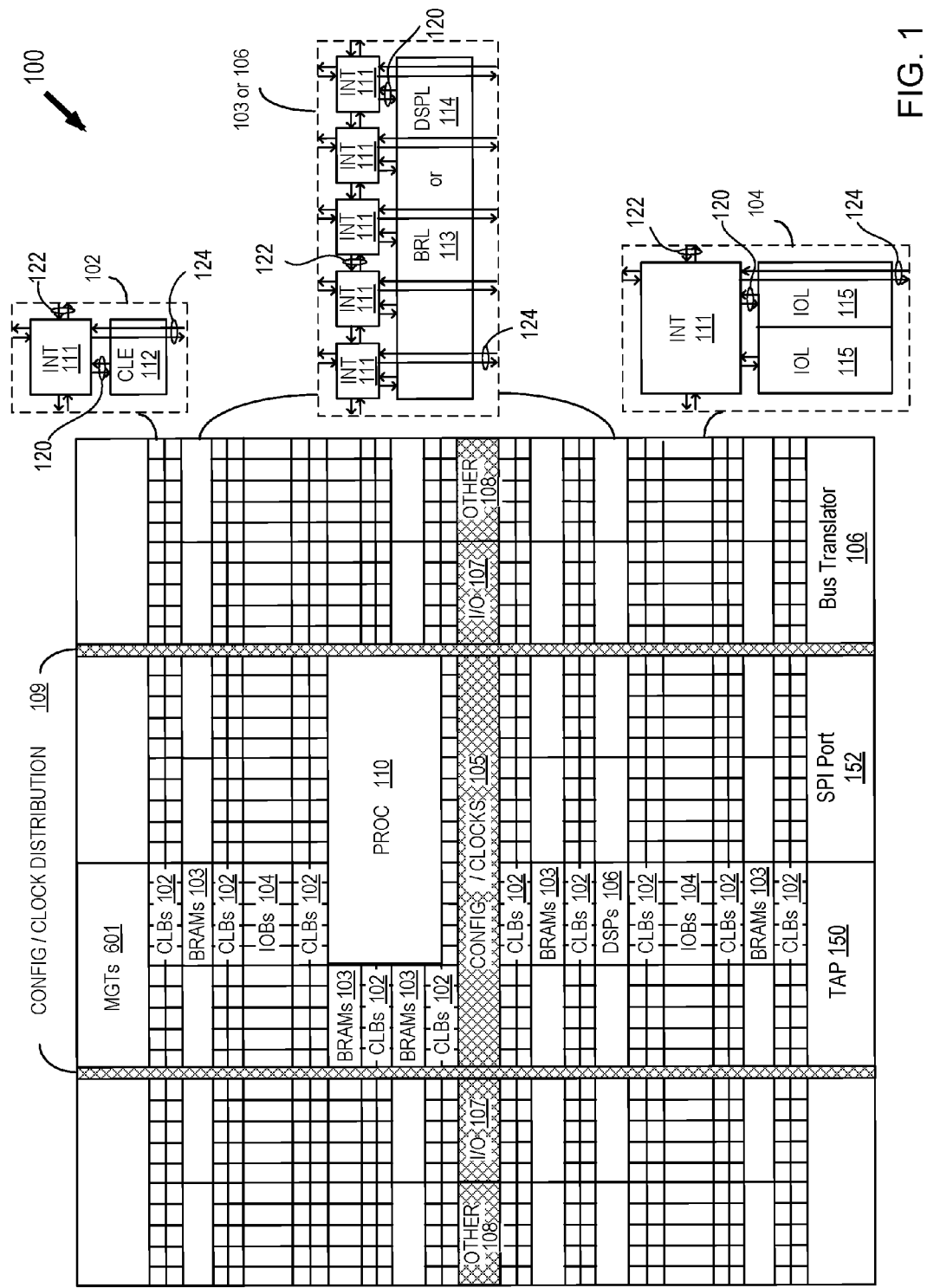
FIG. 1 is a block diagram illustrating an exemplary architecture for an IC according to some embodiments of the present disclosure.

Various embodiments are described hereinafter with reference to the figures, in which exemplary embodiments are shown. The claimed invention may, however, be embodied in different forms and should not be construed as being limited to the embodiments set forth herein. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described. The features, functions, and advantages may be achieved independently in various embodiments or may be combined in yet other embodiments.

Before describing exemplary embodiments illustratively depicted in the several figures, a general introduction is provided to further understanding. Large-scale or massive multi-user (MU) MIMO systems use a large number of antenna units having orders of magnitude more elements at the base station compared to small-scale MIMO systems, while serving multiple users simultaneously and in the same frequency band. However, having a large number of antenna units at the base station may significantly increase the complexity of computations performed in large-scale MIMO. Multi-carrier waveforms exhibit strong frequency localization and low out-of-band (OOB) emissions, for example, the GFDM waveform, may be used to achieve higher data rates and low latency. Deploying such multi-carrier waveforms in a large-scale MIMO system can be challenging on error-rate performance, computational complexity, and linearity requirements. For integrated circuit (IC) solutions, it has been discovered that low complexity data detection methods may be exploited to enable high performance linear data detection, which enables designs with low hardware complexity, improves IC performance in computation bandwidth or speed, power consumption, manufacturing cost, and/or form factor.

With the above general understanding borne in mind, various embodiments for MIMO GFDM data detection are generally described below. In the discussion below, boldface lower case letters denote column vectors, and boldface upper case letters denote matrices. For a matrix A, its $j^{th}$ column is denoted as $a_j$. The transpose and the Hermitian transpose is denoted as $A^T$ and $A^H$. The N×N identity matrix is denoted as $I_N$. The N×N normalized discrete Fourier transform (DFT) matrix is denoted as $F_N$. The N×N normalized inverse DFT matrix is denoted as $F_N^H$, where $F_N F_N^H = I_N$. For a column vector a, the $i^{th}$ element of a is denoted by $a_i$. A vector that consists of element-wise reciprocals of a is denoted as 1/a.

Because one or more of the above-described embodiments are exemplified using a particular type of IC, a detailed description of such an IC is provided below. However, it should be understood that other types of ICs may benefit from one or more of the embodiments described herein.

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. As used herein, "include" and "including" mean including without limitation.

Each programmable tile typically includes both programmable interconnect and programmable logic. The programmable interconnect typically includes a large number of interconnect lines of varying lengths interconnected by programmable interconnect points ("PIPs"). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of PLD is the Complex Programmable Logic Device (CPLD). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. In CPLDs, configuration data is typically stored on-chip in non-volatile memory. In some CPLDs, configuration data is stored on-chip in non-volatile memory, then downloaded to volatile memory as part of an initial configuration (programming) sequence.

In general, each of these programmable logic devices ("PLDs"), the functionality of the device is controlled by configuration data provided to the device for that purpose. The configuration data can be stored in volatile memory (e.g., static memory cells, as common in FPGAs and some CPLDs), in non-volatile memory (e.g., FLASH memory, as in some CPLDs), or in any other type of memory cell.

Other PLDs are programmed by applying a processing layer, such as a metal layer, that programmably interconnects the various elements on the device. These PLDs are known as mask programmable devices. PLDs can also be implemented in other ways, e.g., using fuse or antifuse technology. The terms "PLD" and "programmable logic device" include but are not limited to these exemplary devices, as well as encompassing devices that are only partially programmable. For example, one type of PLD includes a combination of hard-coded transistor logic and a programmable switch fabric that programmably interconnects the hard-coded transistor logic.

As noted above, advanced FPGAs can include several different types of programmable logic blocks in the array. For example, FIG. 1 illustrates an exemplary FPGA architecture 100. The FPGA architecture 100 includes a large number of different programmable tiles, including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output blocks ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile can include at least one programmable interconnect element ("INT") 111 having connections to input and output terminals 120 of a programmable logic element within the same tile, as shown by examples included at the top of FIG. 1. Each programmable interconnect element 111 can also include connections to interconnect segments 122 of adjacent programmable interconnect element(s) in the same tile or other tile(s). Each programmable interconnect element 111 can also include connections to interconnect segments 124 of general routing resources between logic blocks (not shown). The general routing resources can include routing channels between logic blocks (not shown) comprising tracks of interconnect segments (e.g., interconnect segments 124) and switch blocks (not shown) for connecting interconnect segments. The interconnect segments of the general routing resources (e.g., interconnect segments 124) can span one or more logic blocks. The programmable interconnect elements 111 taken together with the general routing resources implement a programmable interconnect structure ("programmable interconnect") for the illustrated FPGA.

In an example implementation, a CLB 102 can include a configurable logic element ("CLE") 112 that can be programmed to implement user logic plus a single programmable interconnect element ("INT") 111. A BRAM 103 can include a BRAM logic element ("BRL") 113 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 106 can include a DSP logic element ("DSPL") 114 in addition to an appropriate number of programmable interconnect elements. An 10B 104 can include, for example, two instances of an input/output logic element ("IOL") 115 in addition to one instance of the programmable interconnect element 111. As will be clear to those of skill in the art, the actual I/O pads connected, for example, to the I/O logic element 115 typically are not confined to the area of the input/output logic element 115.

In the example of FIG. 1, an area (depicted horizontally) near the center of the die (e.g., formed of regions 105, 107, and 108 shown in FIG. 1) can be used for configuration, clock, and other control logic. Column 109 (depicted vertically) extending from this horizontal area or other columns may be used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, PROC 110 spans several columns of CLBs and BRAMs. PROC 110 can include various components ranging from a single microprocessor to a complete programmable processing system of microprocessor(s), memory controllers, peripherals, and the like.

In one aspect, PROC 110 is implemented as a dedicated circuitry, e.g., as a hard-wired processor, that is fabricated as part of the die that implements the programmable circuitry of the IC. PROC 110 can represent any of a variety of different processor types and/or systems ranging in complexity from an individual processor, e.g., a single core capable of executing program code, to an entire processor system having one or more cores, modules, co-processors, interfaces, or the like.

In another aspect, PROC 110 is omitted from architecture 100, and may be replaced with one or more of the other varieties of the programmable blocks described. Further, such blocks can be utilized to form a "soft processor" in that the various blocks of programmable circuitry can be used to form a processor that can execute program code, as is the case with PROC 110.

The phrase "programmable circuitry" can refer to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, portions shown in FIG. 1 that are external to PROC 110 such as CLBs 102 and BRAMs 103 can be considered programmable circuitry of the IC.

In some embodiments, the functionality and connectivity of programmable circuitry are not established until configuration data is loaded into the IC. A set of configuration data can be used to program programmable circuitry of an IC such as an FPGA. The configuration data is, in some cases, referred to as a "configuration bitstream." In general, programmable circuitry is not operational or functional without first loading a configuration bitstream into the IC. The configuration bitstream effectively implements or instantiates a particular circuit design within the programmable circuitry. The circuit design specifies, for example, functional aspects of the programmable circuit blocks and physical connectivity among the various programmable circuit blocks.

In some embodiments, circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 110.

In some instances, hardwired circuitry can have one or more operational modes that can be set or selected according to register settings or values stored in one or more memory elements within the IC. The operational modes can be set, for example, through the loading of a configuration bitstream into the IC. Despite this ability, hardwired circuitry is not considered programmable circuitry as the hardwired circuitry is operable and has a particular function when manufactured as part of the IC.

FIG. 1 is intended to illustrate an exemplary architecture that can be used to implement an IC that includes programmable circuitry, e.g., a programmable fabric. For example, the numbers of logic blocks in a row, the relative width of the rows, the number and order of rows, the types of logic blocks included in the rows, the relative sizes of the logic blocks, and the interconnect/logic implementations included at the top of FIG. 1 are purely exemplary. For example, in an actual IC, more than one adjacent row of CLBs is typically included wherever the CLBs appear, to facilitate the efficient implementation of user logic, but the number of adjacent CLB rows varies with the overall size of the IC. Moreover, the FPGA of FIG. 1 illustrates one example of a programmable IC that can employ examples of the interconnect circuits described herein. The interconnect circuits described herein can be used in other types of programmable ICs, such as CPLDs or any type of programmable IC having a programmable interconnect structure for selectively coupling logic elements.

It is noted that the IC that may implement the MIMO GFDM data detection is not limited to the exemplary IC depicted in FIG. 1, and that IC having other configurations, or other types of IC, may also implement the MIMO GFDM data detection.

Figure 2:
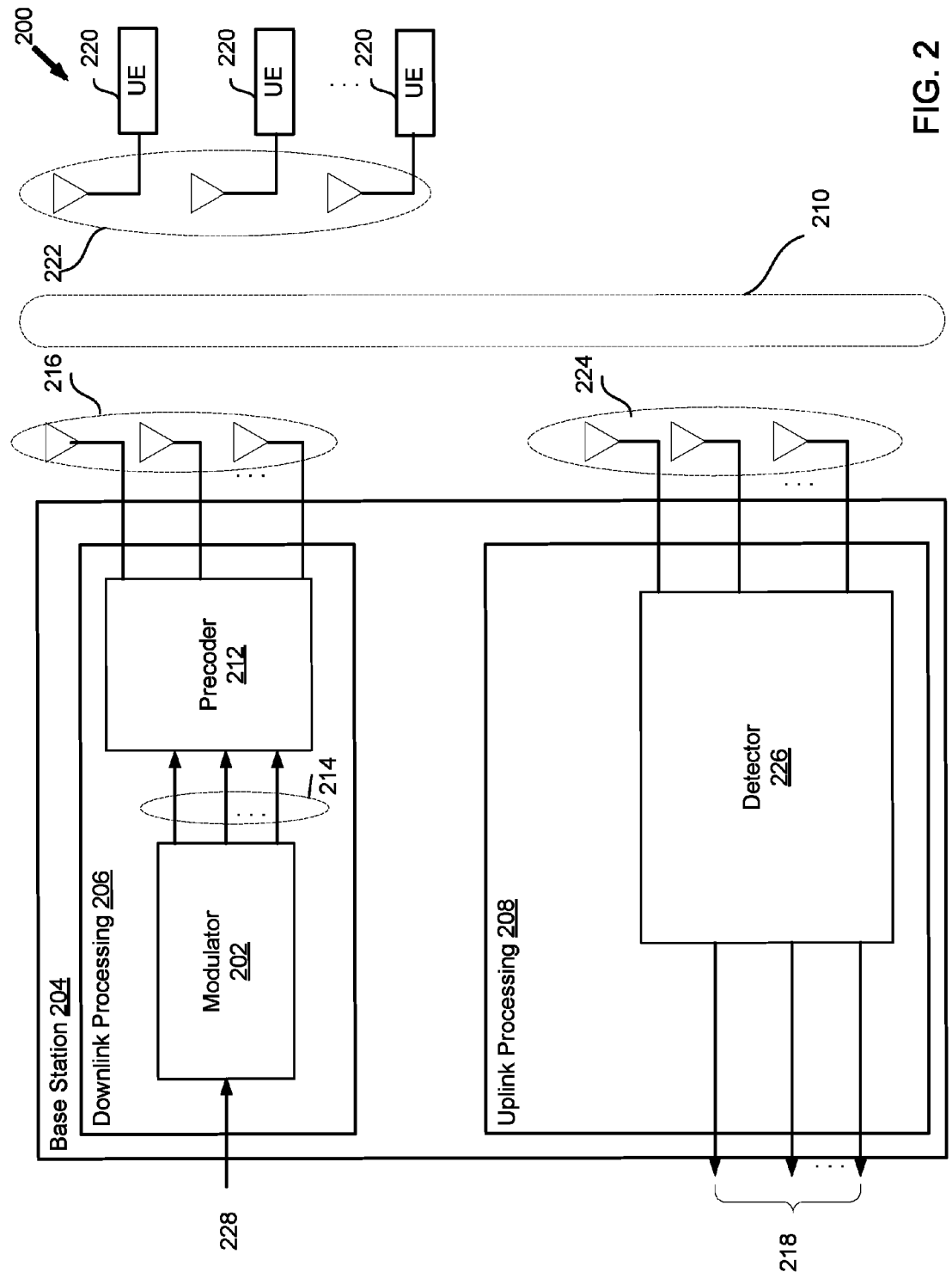
FIG. 2 is a block diagram illustrating an exemplary communication system according to some embodiments of the present disclosure.

FIG. 2 is a block diagram depicting an exemplary communication system 200. Communication system 200 includes a base station 204 and users 220 (also referred to as user devices or user equipment (UE) units). More than one user 220 may be coupled to base station 204 at a time. Users 220 may be coupled to base station 204 via over-the-air ("wireless") communication channel 210.

Communication system 200 is for bidirectional communication, namely a downlink for sending information from base station 204 to users 220, and an uplink for sending information from users 220 to base station 204. Base station 204 may include a downlink processing section 206 and an uplink processing section 208.

In some embodiments, the communication system 200 may be a MIMO system with B base station antennas (e.g., B transmit antennas 216 for a downlink, or B receive antennas 224 for an uplink) at base station 204 communicating with U user antennas 222 of users 220 in a downlink or an uplink, where B and U are positive integers greater than 1. It is noted that transmit antennas 216 and receive antennas 224 may have the same number of antenna units or different numbers of antenna units. Each user 220 may have a single antenna or multiple antennas 222 coupled to base station 204. An example of base station 204 concurrently serving U single antenna users may be applied straightforwardly to base station 204 concurrently serving users 220 with multiple antennas. Thus, even though U as described below may generally refer to U user antennas from U single antenna users, U may be considered to include a number of antennas of single and/or multiple antenna users being serviced by a base station 204.

In some embodiments, the downlink processing section 206 may include a modulator 202. The modulator 202 may be coupled to receive data 228 for transmission, and modulate the received data 228 to provide modulated data 214 during a downlink process. The modulated data 214 may then be sent to a precoder 212 for precoding.

In some embodiments, the uplink processing section 208 may include a detector 226. The detector 226 may be coupled to receive signals from the receive antennas 224, perform data detection to the received signals, and output a signal 218. During an uplink process, the detector 226 may perform equalization and demodulation, which will be described below in additional detail with reference to FIGS. 5 and 6.

The downlink processing section 206, the uplink processing section 208, and each of their blocks may be implemented in hardware, software, or a combination of hardware and software. For purposes of clarity and not limitation, in some embodiments, the downlink processing section 206 and/or the uplink processing section 208 may be implemented using various hardware resources, such as for example DSP slices, BRAM, and programmable resources of an FPGA; however, in other embodiments, digital signal processors, microprocessors, multi-core processors, memory, and/or other hardware may be used.

Figure 3:
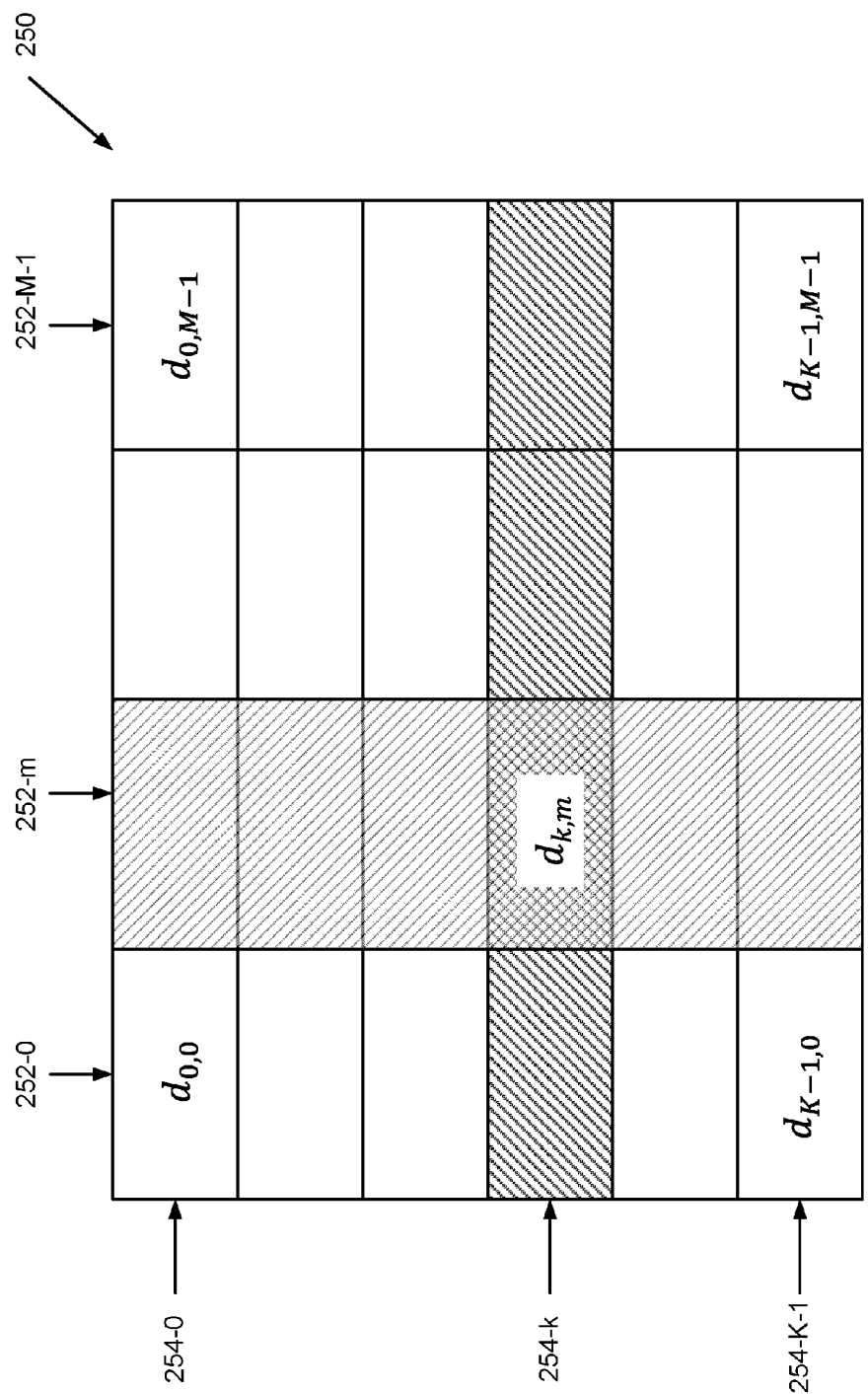
FIG. 3 is a block diagram illustrating an exemplary GFDM data structure according to some embodiments of the present disclosure.

Referring to FIG. 3, illustrated is an exemplary GFDM structure 250. GFDM is a multicarrier waveform that may be utilized by the communication system 200 for transmitting data symbols. The GFDM data may be transmitted per frame in a block-based GFDM structure 250 that includes M time-slots (also referred to as subsymbols) and K subcarriers, where M and K are positive integers. As such, GFDM may transmit MK data symbols per frame. Each data symbol that is transmitted on the $k^{th}$ subcarrier and $m^{th}$ time-slot is denoted by $d_{k,m}$, where k=0, ..., K−1, and m=0, ..., M−1. The rows and columns correspond to the time and frequency resources respectively. Each column 252-$m$ corresponds to symbols transmitted on the $m^{th}$ time-slot, and may be denoted as $d_m$, where $d_m=[d_{0,m}, ..., d_{K-1,m}]^T$. Each row 254-$k$ corresponds to symbols transmitted in the $k^{th}$ subcarrier. The data symbols of the data structure 250 may be expressed as a data matrix D=$[d_0, ..., d_{M-1}]$. In such GFDM waveform, individual sub-carrier signals are circularly convolved with a prototype filter, which may improve frequency localization and reduce out-of-band (OOB) emissions. Fifth generation (5G) wireless systems may combine the GFDM waveform and large scale MIMO technologies to improve the spectral efficiency, reduce out-of-band (OOB) emissions, and achieve strong frequency-localization.

Figure 4:
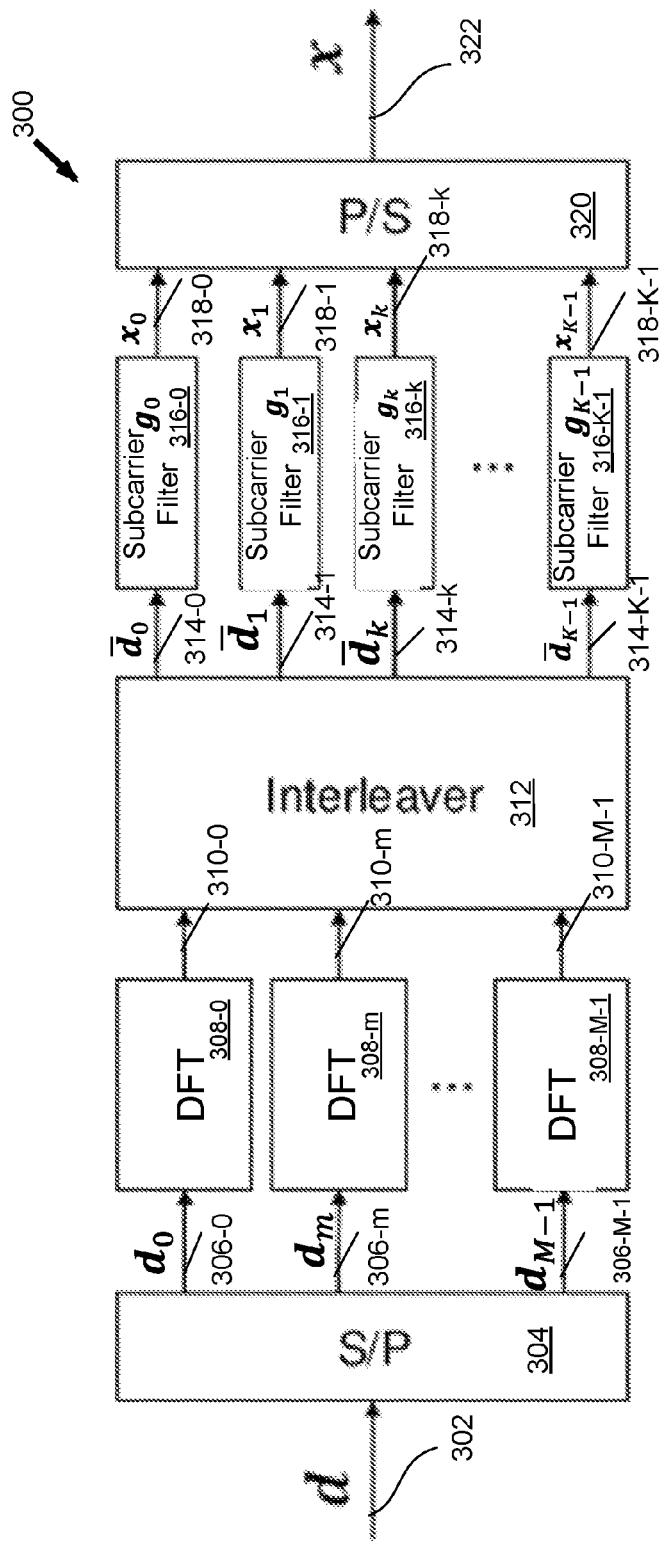
FIG. 4 is a block diagram illustrating an exemplary GFDM modulator according to some embodiments of the present disclosure.

Referring to FIG. 4, illustrated is an exemplary modulator 300 performing GFDM modulation, and is also referred to as a GFDM modulator 300. The GFDM modulator 300 includes a serial-to-parallel converter 304 receives a serial signal 302 including data symbols d for transmission, and converts the serial signal to M parallel signals 306-0, ..., 306-m, ..., 306-M−1. In some embodiments, a signal 306-m includes data symbol $d_m^{(j)}$ transmitted on the $m^{th}$ time-slot, where $d_m^{(j)} = [d_{0,m}^{(j)}, \ldots, d_{K-1,m}^{(j)}]^T$, and j is a user index. Because the GFDM modulator 300 performs the modulation on a per-user basis, the user index j is omitted in the following discussion with reference to FIG. 4.

As illustrated in FIG. 4, the GFDM modulator 300 includes DFT blocks 308-0, ... 308-m, ..., 308-M−1, which receive the signals 306-0, ..., 306-m, ..., 306-M−1 respectively. Each DFT block 308-m performs a K-point DFT to the corresponding data symbols $d_m$ transmitted on the $m^{th}$ time-slot, and is also referred to as a time-slot DFT block 308-m. Each DFT block 308-m outputs a signal 310-m expressible as $F_K d_m$.

In some embodiments, signals 310-0, ..., 310-m, ..., 310-M−1 are sent to an interleaver 312. The interleaver 312 generates a matrix using $F_K d_m$ as the $m^{th}$ column vector, take the transpose of the resulting matrix, and obtains a matrix $\overline{D}$ expressible as:

$$\overline{D} = [F_K d_0, \ldots, F_K d_m, \ldots, F_K d_{M-1}]^T.$$

The interleaver 312 then outputs signals 314-0, ..., 314-K−1, where each signal 314-k corresponds to the $k^{th}$ column of the matrix $\overline{D}$, denoted as $\overline{d}_k$.

In some embodiments, each column vector $\overline{d}_k$ is sent to a subcarrier filter unit 316-k (also referred to as a subfilter unit 316-k), which applies a filter $g_k$ to the $k^{th}$ subcarrier. In some examples, the filter $g_k$ is a polyphase component $g_k$ of a transmit filter g (e.g., a polyphase filter g). In some examples, the transmit filter g is a prototype filter (e.g., a root-raised cosine filter) of length M*K. The subcarrier filter unit 316-k circularly convolves $g_k$ and $\overline{d}_k$, and obtain the GFDM signal in the time domain as follows:

$$x_k = g_k \circledast \overline{d}_k,$$

Where $x_k = [x_k, x_{k+K}, \ldots, x_{k+(M-1)K}]^T$, and $g_k = [g_k, g_{k+K}, \ldots, g_{k+(M-1)K}]^T$.

The GFDM signals 318-0 to 318-K−1 are sent to a parallel-to-serial converter 320, which converts the GFDM signals 318-0 to 318-K−1 to a serial signal 322 including the GFDM signal in the time domain x. The frequency domain GFDM signal s may be obtained as:

$$s = [F_K x_0, \ldots, F_K x_m, \ldots, F_K x_{M-1}]^T.$$

In some embodiments, in the uplink, the $j^{th}$ user 220 transmits the frequency domain GFDM symbols $s^{(j)}$ on M time-slots, which may be modeled as:

$$s^{(j)} = [s_0^{(j)}, \ldots, s_{M-1}^{(j)}].$$

The K-dimensional entries of the $m^{th}$ time-slot $s_m^{(j)}$ are assigned to K dedicated data-carrying subcarriers respectively, where $s_m^{(j)}$ is modeled as:

$$s_m^{(j)} = [s_{0,m}^{(j)}, \ldots, s_{K-1,m}^{(j)}]^T.$$

In some embodiments, for each user 220, the symbols $s^{(j)}$ are transformed to the time domain. All U users 220 then transmit their time-domain signals over the wireless communication channel 210.

Figure 5:
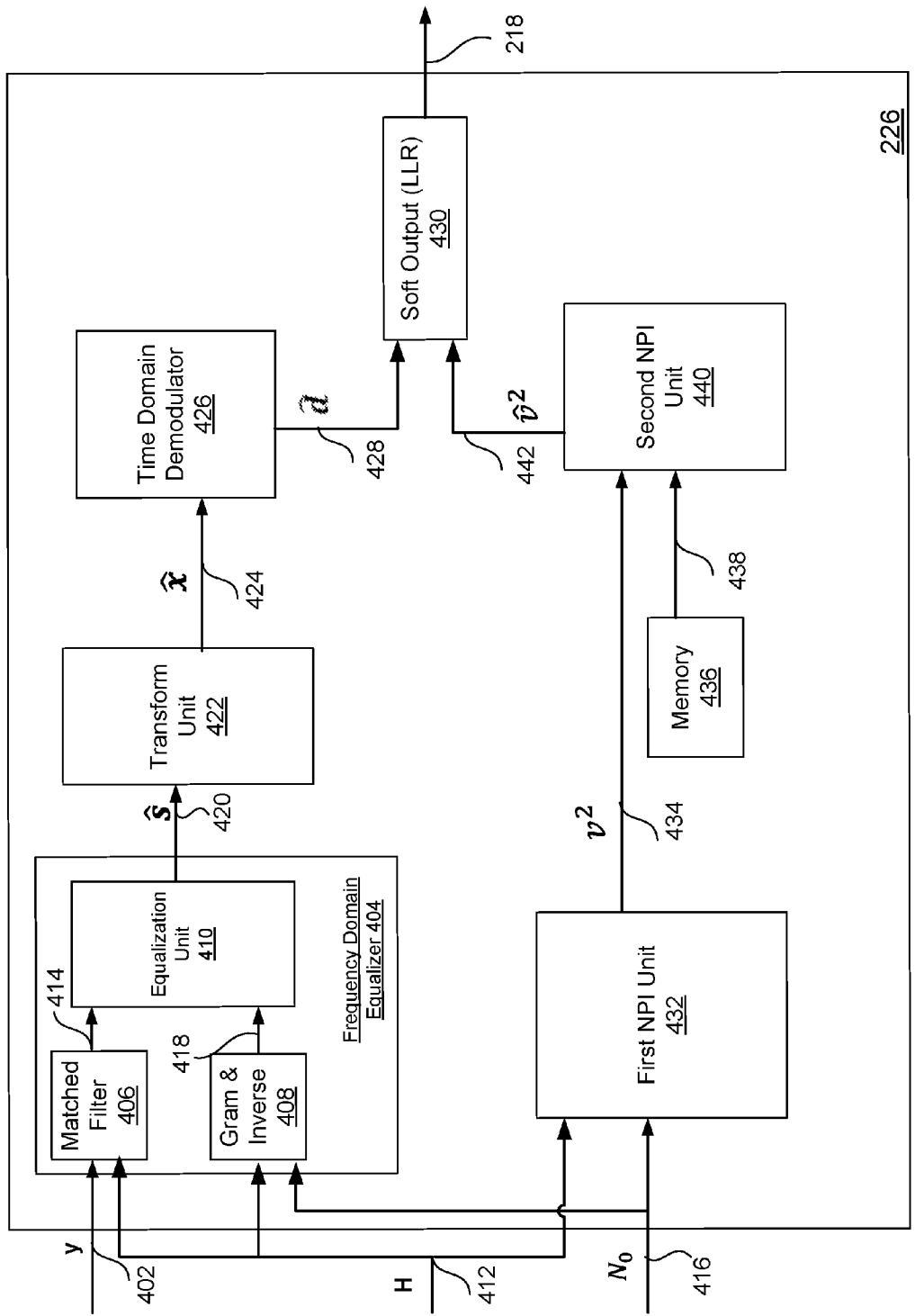
FIG. 5 is a block diagram illustrating an exemplary detector according to some embodiments of the present disclosure.

Referring to FIG. 5, illustrated is an exemplary GFDM detector 226 of the uplink processing section 208 for performing a data detection on received symbols at the receive antennas 224 of the base station 204.

In some embodiments, at the base station 204, each receive antenna 224 may obtain a mixture of time-domain signals from all U users 220. For uplink data detection, the time-domain signals received at each receive antenna 224 are first transformed back into the frequency domain (e.g., using an inverse discrete Fourier transform (DFT)). The received frequency domain (FD) symbols transmitted on the $k^{th}$ subcarrier and the $m^{th}$ time-slot $y_{k,m}$ (also referred to as receive vector) received by base station 204 can be modeled as $y_{k,m} = H_{k,m} s_{k,m} + n_{k,m}$, with the following definitions:

$$y_{k,m} = [y_{k,m}^{(0)}, \ldots, y_{k,m}^{(B-1)}]^T, s_{k,m} = [s_{k,m}^{(0)}, \ldots, s_{k,m}^{(U-1)}]^T, n_{k,m} = [n_{k,m}^{(0)}, \ldots, n_m^{(B-1)}]^T,$$

and $$H_{k,m} = \begin{bmatrix} h_{k,m}^{(0,0)} & \cdots & h_{k,m}^{(0,U-1)} \\ \vdots & \ddots & \vdots \\ h_{k,m}^{(B-1,0)} & \cdots & h_{k,m}^{(B-1,U-1)} \end{bmatrix}.$$

Here, for the $m^{th}$ time-slot, $y_{k,m}^{(i)}$ is the FD symbol received on the $k^{th}$ subcarrier for the $i^{th}$ receive antenna 224. $H_{k,m}$ is a channel matrix where $h_{k,m}^{(i,j)}$ is the corresponding (flat-fading) frequency gain/attenuation on the $k^{th}$ subcarrier between the $i^{th}$ receive antenna 224 and $j^{th}$ user 220. The scalar $s_{k,m}^{(j)}$ denotes the symbol transmitted by the $j^{th}$ user 220 on the $k^{th}$ subcarrier and the $m^{th}$ time-slot, and the scalar $n_{k,m}^{(i)}$ represents noise at the $i^{th}$ receive antenna 224 in the frequency domain (e.g., complex i.i.d. zero-mean Gaussian noise with variance $N_0$).

In some embodiments, the detector 226 includes a frequency domain equalizer 404 performs linear FD minimum mean-square error (MMSE) equalization on a per-subcarrier basis for each time-slot of the received symbols. The FD equalizer 404 includes a matched filter 406, a Gram matrix and inversion unit 408, and an equalization unit 410. For each subcarrier k, the matched filter 406 receives a signal 402 including a receive vector $y_{k,m}$ for the $k^{th}$ subcarrier and the $m^{th}$ time-slot. The matched filter 406 further receives a signal 412 including an uplink channel matrix $H_{k,m}$, and computes a matched filter $f_{k,m}^{MF}$ where $f_{k,m}^{MF} = H_{k,m}^H y_{k,m}$. The matched filter 406 outputs a signal 414 having the value $f_{k,m}^{MF}$, and sends the signal 414 to an input of the equalization unit 410.

In some embodiments, for each subcarrier k, the Gram matrix and inversion unit 408 receives the signal 412 including an uplink channel matrix $H_{k,m}$ at a first input and receives a signal 416 including a noise variance $N_0$ at a second input. The Gram matrix and inversion unit 408 may compute a Gram matrix $G_{k,m}$ for the $k^{th}$ subcarrier and the $m^{th}$ time-slot using the uplink channel matrix $H_{k,m}$, where $$G_{k,m} = H_{k,m}^H H_{k,m}.$$

In some embodiments, the Gram matrix and inversion unit 408 further computes a regularized Gram matrix $A_{k,m}$ using the Gram matrix $G_{k,m}$ and the noise variance $N_0$, where $$A_{k,m} = G_{k,m} + N_0 I_U.$$

In some embodiments, the Gram matrix and inversion unit 408 performs a matrix inversion of a regularized Gram matrix $A_{k,m}$ to determine a matrix inverse $A_{k,m}^{-1}$, and outputs a signal 418 including the matrix inverse $A_{k,m}^{-1}$. The signal 418 is sent to an input of the equalization unit 410.

In some embodiments, after receiving the signal 414 including the matched filter $f_{k,m}^{MF}$ and the signal 418 including the matrix inverse $A_{k,m}^{-1}$, the equalization unit 410 computes FD-equalized estimates $\hat{s}_{k,m}$ for $s_{k,m}$ as:

$$\hat{s}_{k,m} = A_{k,m}^{-1} f_{k,m}^{MF}.$$

In some embodiments, the FD-equalized estimates $\hat{s}_{k,m}$ for all subcarriers and time-slots are aggregated (e.g., by using a data buffer or memory) to provide aggregated FD-equalized estimates $\hat{s}$ at an output 420.

In some embodiments, the detector 226 includes a transform unit 422 following the frequency domain equalizer 404, which is then followed by a time domain demodulator 426. As illustrated in FIG. 5, the aggregated FD-equalized estimates $\hat{s}$ are sent to a transform unit 422, which computes the FD equalized estimates in the time domain $\hat{x}$ as:

$$\hat{x} = [(F^H \hat{s}_0)^T, \ldots, (F^H \hat{s}_{M-1})^T]^T.$$

The transform unit 422 outputs a serial signal 424 including $\hat{x}$ to a time domain demodulator 426. In some examples, the time domain demodulator 426 performs demodulation to $\hat{x}$ on a per-user basis, and outputs a signal 428 including the estimates of the data symbols $\hat{d}$. The time domain demodulator 426 will be described below in additional detail with reference to FIG. 6. The signal 428 including the estimates of data symbols $\hat{d}$ is sent to a linear soft-output computation unit 430. In some examples, the linear soft-output computation unit 430 computes soft-estimates in the form of log-likelihood ratio (LLR) values, and is also referred to as an LLR unit 430.

Figure 6:
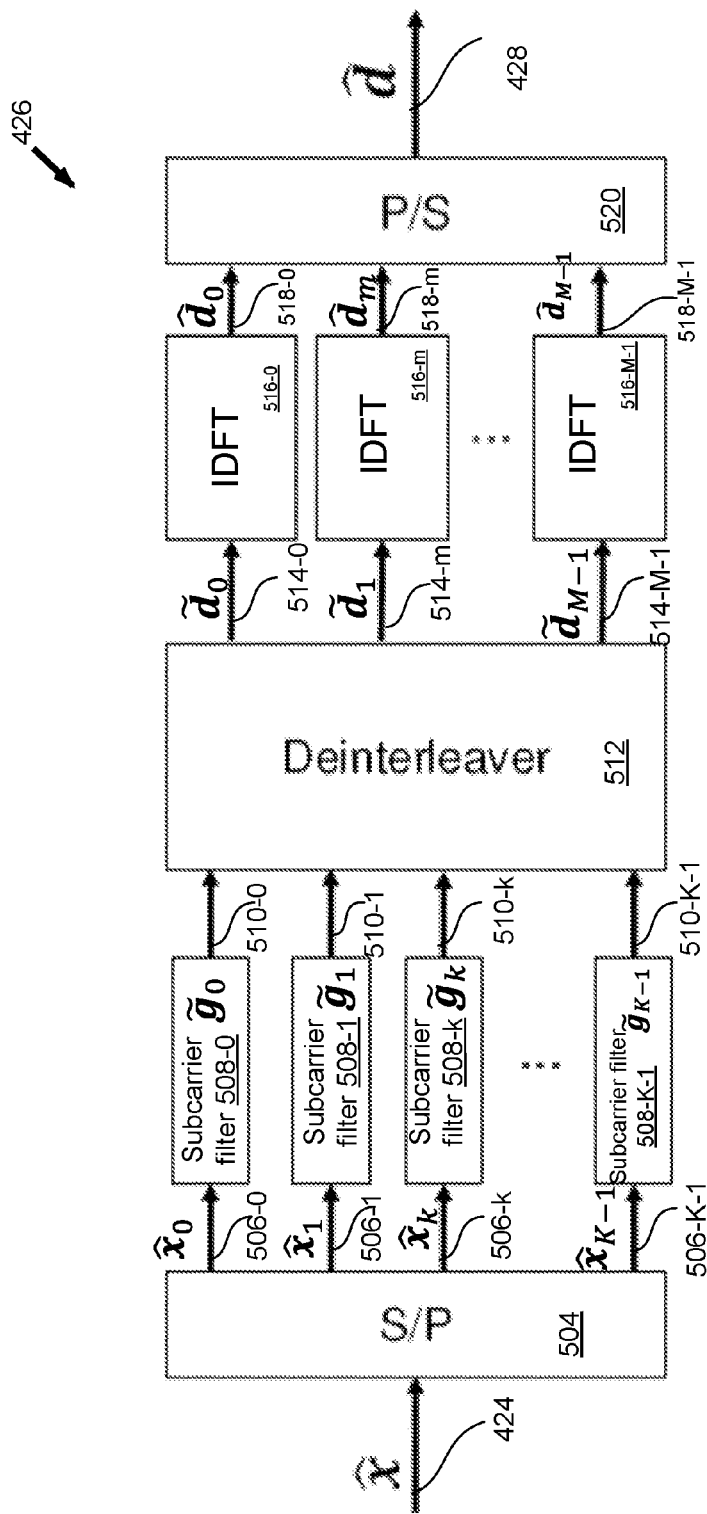
FIG. 6 is a block diagram illustrating an exemplary GFDM time domain demodulator according to some embodiments of the present disclosure.

Referring to FIG. 6, illustrated is an exemplary time domain demodulator 426 performing GFDM demodulation. The time domain demodulator 426 performs zero-forcing (ZF) equalization, and is also referred to as a ZF-GFDM demodulator 426. Because the time domain demodulator 426 performs demodulation on a per-user basis, the user index j is omitted in the following discussion with reference to FIG. 6.

As illustrated in FIG. 6, the time domain demodulator 426 includes a serial-to-parallel converter 504. For each user index j, the serial-to-parallel converter 504 receives a serial signal 424 including the FD equalized estimates in the time domain $\hat{x}$, and converts the serial signal 424 to parallel signals 506-0, ..., 506-k, ..., 506-K−1. Here K is a positive integer corresponding to the number of subcarriers, and k is an integer between 0 and K−1. In some embodiments, each signal 506-k includes data $\hat{x}_k$ modeled as $\hat{x}_k = [\hat{x}_k, \hat{x}_{k+K}, \ldots, \hat{x}_{k+(M-1)K}]^T$ corresponding to the $k^{th}$ subcarrier.

The parallel signals 506-0, ..., 506-k, ..., 506-K−1 are sent to subcarrier filter unit 508-0, ..., 508-k, ..., 508-K−1 respectively. Each subcarrier filter unit 508-k provides an estimate $\tilde{g}_k$ of a polyphase component $g_k$ of a transmit filter g, where the transmit filter g is used to modulate the data symbols d to be transmitted by the GFDM modulator 300 discussed above with reference to FIG. 4. The estimate $\tilde{g}_k$ is chosen such that $F_M \tilde{g}_k = 1/F_M g_k$. The subcarrier filter unit 508-k circularly convolves $\hat{x}_k$ with $\tilde{g}_k$ to obtain:

$$e_k = \tilde{g}_k \circledast \hat{x}_k.$$

Each subcarrier filter unit 508-k outputs a signal 510-k having the value $e_k$. The signals 510-0, ..., 510-k, ..., 510-K−1 are sent to a deinterleaver 512. The deinterleaver 512 generates a matrix E using $e_k$ as the $k^{th}$ column vector, and takes a transpose of the matrix E to obtains a matrix $\tilde{D} = E^T$. The deinterleaver 512 outputs M signals 514-0, ..., 514-M−1 corresponding to the column vectors $\tilde{d}_0, \ldots, \tilde{d}_{M-1}$ of the matrix b respectively.

In the example of FIG. 6, each signal 514-m is sent to an inverse discrete Fourier transform (IDFT) unit 516-m. Each IDFT unit 516-m performs a K-point IDFT to the column vector $\tilde{d}_m$ corresponding to the $m^{th}$ time-slot, and is also referred to as time-slot IDFT unit 516-m. Each IDFT unit 516-m outputs a signal 518-m having a value $\hat{d}_m$, where $\hat{d}_m = F_K^H \tilde{d}_0$. The estimates of the data symbols $\hat{D}$ may be expressed as follows:

$$\hat{D} = [F_K^H \tilde{d}_0, \ldots, F_K^H \tilde{d}_{M-1}] = [\hat{d}_0, \ldots, \hat{d}_{M-1}].$$

In some embodiments, signals 518-0, ..., 518-M−1 are sent to a parallel-to-serial converter 520, which converts the signals 518-0, ..., 518-M−1 to a serial signal 428 including the serial estimates of the data symbols d generated from the matrix of estimates of the data symbols $\hat{D}$.

It is noted that while a ZF-GFDM demodulator is illustrated in FIG. 6, it is exemplary only and not intended to be limiting beyond what is specifically recited in the claims that follow. It will be understood by those skilled in that art that the time domain demodulator 426 may include various types of demodulators, for example, MMSE-GFDM demodulators and/or matched filter (MF)-GFDM demodulators.

Referring back to FIG. 5, in some embodiments, to generate an accurate soft output, a noise plus interference (NPI) variance resulting from the frequency domain equalization performed by the FD equalizer 404 and the time domain demodulation performed by the time domain demodulator 426 are computed. The detector 226 includes a first NPI unit 432, a second NPI unit, and a memory 436 for computing the NPI variance $\hat{v}^2$.

In some embodiments, the first NPI unit 432 receives a signal 412 including the channel matrix $H_{k,m}$ at a first input, and receives a signal 416 including the noise variance $N_0$ at a second input. The first NPI unit 432 may compute a first time domain NPI variance $v^2$, for example, by using the channel matrix $H_{k,m}$ and the noise variance $N_0$, after the frequency domain equalization is performed by the frequency domain equalizer 404. As such, the first time domain NPI variance $v^2$ is also referred to as a post-FD equalization NPI variance $v^2$. The first NPI unit 432 outputs a signal 434 including the first NPI variance $v^2$. In some embodiments, the first NPI unit 432 receives the matrix inverse $A_{k,m}^{-1}$ from the Gram matrix and inversion unit 408, and uses the received matrix inverse $A_{k,m}^{-1}$ to compute the first NPI variance $v^2$. In some embodiments, as the NPI variance values are computed on a per-subcarrier basis, an NPI buffer is used to aggregate the NPI variance values for the subcarriers to generate the first NPI variance $v^2$.

In some embodiments, a second NPI unit 440 is used to compute a second NPI variance that results from the time domain demodulation performed by the time domain demodulator 426 using the first NPI variance $v^2$. In some examples where the time domain demodulator 426 performs circular convolution of the equalized time-slots $\hat{x}_k$ with $\tilde{g}_k$ as described above with reference to subfilters 508-k of FIG. 6, a second NPI variance for sub-carrier k, denoted by $\tilde{v}_k^2$, may be computed as:

$$\tilde{v}_k^2 = \frac{1}{M} v^2 \sum_{m=0}^{M-1} |\tilde{g}_{k,m}|^2,$$

where correlation in the post-FD equalization noise is ignored.

In some examples, a K-point IDFT is performed across each subcarrier k as described above with reference to the IDFT unit 516-*m* of FIG. 6. As such, the final NPI variance, denoted as $\hat{v}^2$, may be computed as:

$$\hat{v}^2 = \frac{1}{K}\sum_{k=0}^{K-1}\hat{v}_k^2 = v^2 \frac{1}{KM}\sum_{k=0}^{K-1}\sum_{m=0}^{M-1}|\tilde{g}_{k,m}|^2.$$

As $\tilde{g}_{k,m}$ may be determined offline, the term $$\frac{1}{KM}\sum_{k=0}^{K-1}\sum_{m=0}^{M-1}|\tilde{g}_{k,m}|^2$$

(also referred to as a TD demodulation NPI variance term) may be computed offline and stored in the memory 436, and sent to an input of the second NPI unit 440 on a signal 438.

In some embodiments, as illustrated in FIG. 5, the second NPI unit 440 computes the final NPI variance $\hat{v}^2$ by multiplying the term $$\frac{1}{KM}\sum_{k=0}^{K-1}\sum_{m=0}^{M-1}|\tilde{g}_{k,m}|^2$$

received at the signal 438 from the memory 436 and the post-FD equalization NPI variance $v^2$ received at the signal 434. The second NPI unit 440 outputs a signal 442 having the final NPI variance $\hat{v}^2$, and send the signal 442 to the soft-output computation unit 430.

In some embodiments, the soft-output computation unit 430 generates log-likelihood ratio (LLR) values given the final NPI variance $\hat{v}^2$ and the demodulated signal $\hat{d}$, and outputs a soft-output signal 218 including the LLR values.

In various embodiments, the detector 226 with its blocks may be implemented in hardware, software, or a combination of hardware and software. For purposes of clarity and not limitation, in some embodiments, the detector 226 may be implemented using various hardware resources, such as for example DSP slices, BRAM, and programmable resources of an FPGA; however, in other embodiments, digital signal processors, microprocessors, multi-core processors, memory, and/or other hardware may be used.

Referring now to the examples of FIGS. 7A, 7B, 7C, and 7D, illustrated therein are example simulations showing frame error rate (FER) against energy per bit to noise power spectral density ratio ($E_b/N_0$) for uplink data detection according to various embodiments with different configurations (e.g., receive antenna number of base station denoted by B, user antenna number denoted by U). FIGS. 7A-7D correspond to communication systems with different base station antenna number and user antenna number configurations respectively. FIG. 7A corresponds to a communication system with eight base station receive antennas and eight user antennas. FIG. 7B corresponds to a communication system with sixteen base station receive antennas and eight user antennas. FIG. 7C corresponds to a communication system with thirty-two base station receive antennas and eight user antennas. FIG. 7D corresponds to a communication system with sixty-four base station receive antennas and eight user antennas. In each of the examples of FIGS. 7A-7D, four PER curves correspond to four embodiments for data detection are illustrated. Those embodiments use OFDM, single-carrier frequency division multiple access (SC-FDMA), filter bank multicarrier (FBMC), and GFDM waveforms respectively.

In the simulation, a 20 MHz bandwidth with K subcarriers LTE uplink system is used, where K=1200. For OFDM, SC-FDMA, and GFDM, the system uses a 64-QAM modulation scheme, and includes M time-slots per frame, where M=14. For GFDM, a root-raised cosine filter of length MK with a roll-off factor of 0.25 is used as the transmit filter. For FBMC, a physical layer for dynamic access and cognitive radio (PHYDSAS) filter of length 4K is used, and the data symbols are drawn from 8-level Pulse-amplitude modulation (PAM). To match the data rate, FBMC is assumed to use M=17.5 time-slots per frame. A WINNER-Phase-2 channel model with 6 cm antenna spacing is considered. A per-user rate-3/4 3rd Generation Partnership Project (3GPP) LTE turbo code is used in the simulation system. As shown in FIGS. 7A-7D, as the base station receive antenna number B grows, FER performance of embodiments employing GFDM may become very close to the FER performance of the OFDM. One explanation is that by increasing the number of base station antennas, the Gram matrix $G_{k,m}$ becomes diagonally dominant due to channel hardening, which in turn, reduces intersymbol interference (ISI). Consequently, the performance gap of those modulation schemes becomes smaller for larger B to U ratios.

It is noted that various configurations (e.g., B, U, K, M) illustrated in FIGS. 2, 3, 4, 5, 6, 7A, 7B, 7C, and 7D are exemplary only and not intended to be limiting beyond what is specifically recited in the claims that follow. It will be understood by those skilled in that art that other configurations may be used.

Various advantages may be present in various applications of the present disclosure. No particular advantage is required for all embodiments, and different embodiments may offer different advantages. One of the advantages of some embodiments is that computational complexity is reduced for the uplink data detection process in a communication system using GFDM. For example, the uplink data detection performs a frequency domain MMSE equalization first to obtain initial frequency domain estimates of the data symbols. For further example, the frequency domain MMSE equalization is followed by a time domain ZF-GFDM demodulation. Such time domain ZF-GFDM demodulator may perform the demodulation without performing $(KM)^2$ complex-valued multiplications, which is achieved by applying subcarrier filters to vectors corresponding to each subcarrier, and performing time-slot IDFT to vectors corresponding to each time-slot. Another advantage of some embodiments is that computational complexity for the NPI variance computation is reduced. For example, a TD demodulation NPI variance term may be computed offline, which is then applied to a post FD-equalized NPI variance to generate an NPI variance resulting from both the FD equalization and the TD demodulation.

Although particular embodiments have been shown and described, it will be understood that it is not intended to limit the claimed inventions to the preferred embodiments, and it will be obvious to those skilled in the art that various changes and modifications may be made without department from the spirit and scope of the claimed inventions. The specification and drawings are, accordingly, to be regarded in an illustrative rather than restrictive sense. The claimed inventions are intended to cover alternatives, modifications, and equivalents.

What is claimed is:

1. A method, comprising:
   receiving frequency domain (FD) symbols associated with data symbols transmitted in a channel on a frame including a plurality of subcarriers and a plurality of time-slots;
   performing an equalization process to the received FD symbols to generate FD equalized symbols;
   transforming the FD equalized symbols to time domain (TD) symbols; and
   performing a demodulation process to the TD symbols to provide estimates of the data symbols, wherein the demodulation process includes:
   generating a plurality of first subcarrier symbol vectors associated with the plurality of subcarriers respectively from the TD symbols;
   obtaining a plurality of second subcarrier symbol vectors by circularly convolving each of the plurality of first subcarrier symbol vectors with a subcarrier filter; and
   providing estimates of the data symbols based on the plurality of second subcarrier symbol vectors.

2. The method of claim 1, wherein the providing estimates of the data symbols based on the plurality of second subcarrier symbol vectors includes:
   generating a plurality of time-slot symbol vectors associated with the plurality of time-slots respectively using the plurality of second subcarrier symbol vectors; and
   performing an inverse discrete Fourier transform to each time-slot symbol vector to provide estimates of the data symbols.

3. The method of claim 2, wherein the generating the plurality of time-slot symbol vectors includes:
   generating a first matrix, where each of the plurality of second subcarrier symbol vectors is a column vector of the first matrix;
   generating a second matrix by transposing the first matrix; and
   providing column vectors of the second matrix as the plurality of time-slot symbol vectors associated with the plurality of time-slots respectively.

4. The method of claim 1, wherein the equalization process includes a minimum mean-square error (MMSE) equalization process.

5. The method of claim 1, wherein the performing demodulation process includes performing a zero-forcing (ZF) equalization process.

6. The method of claim 1, further comprising:
   computing a noise plus interference (NPI) variance resulting from the equalization process and the demodulation process; and
   generating a soft-output signal using the NPI variance and the estimates of the data symbols.

7. The method of claim 6, wherein the soft-output signal includes log-likelihood ratio (LLR) values.

8. The method of claim 6, wherein the computing the NPI variance includes:
   obtaining a first NPI variance resulting from performing the equalization process; and
   multiplying a demodulation NPI variance term retrieved from a memory and the first NPI variance to provide the NPI variance.

9. The method of claim 8, further comprising:
   performing a generalized frequency division multiplexing (GFDM) modulation process to the data symbols to generate a GFDM signal for transmission in the channel,
   wherein a transmit filter is applied for each subcarrier using circular convolution.

10. The method of claim 9, wherein the demodulation NPI variance term is expressible as:

$$\frac{1}{KM} \sum_{k=0}^{K-1} \sum_{m=0}^{M-1} |\tilde{g}_{k,m}|^2,$$

wherein K represents a first number of the plurality of subcarriers,
wherein M represents a second number of the plurality of time-slots,
wherein $\tilde{g}_{k,m}$ is chosen such that:

$$F_M \tilde{g}_{k,m} = 1/F_M g_{k,m},$$

wherein $F_M$ is an M×M normalized discrete Fourier transform (DFT) matrix, and
wherein $g_{k,m}$ is a component of the transmit filter.

11. A system, comprising:
    an equalization circuit configured to:
    receive frequency domain (FD) symbols associated with data symbols transmitted in a channel on a frame including a plurality of subcarriers and a plurality of time-slots; and
    perform an equalization process to the received FD symbols to generate FD equalized symbols;
    a transform circuit configured to transform the FD equalized symbols to time domain (TD) symbols; and
    a time domain demodulator circuit configured to perform a demodulation process to the TD symbols to provide estimates of the data symbols,
    wherein the time domain demodulator circuit includes:
    a serial-to-parallel converter configured to generating a plurality of first subcarrier symbol vectors associated with the plurality of subcarriers respectively from the TD symbols;
    a plurality of subcarrier filter circuits configured to generate a plurality of second subcarrier symbol vectors by circularly convolving each of the plurality of first subcarrier symbol vectors with a subcarrier filter; and
    a subcarrier filter output handler configured to provide estimates of the data symbols based on the plurality of second subcarrier symbol vectors.

12. The system of claim 11, wherein the subcarrier filter output handler includes
    an deinterleaver circuit configured to generate a plurality of time-slot symbol vectors associated with the plurality of time-slots respectively using the plurality of second subcarrier symbol vectors; and
    a plurality of inverse discrete Fourier transform (IDFT) circuits configured to perform an inverse discrete Fourier transform to each time-slot symbol vector to provide estimates of the data symbols.

13. The system of claim 12, wherein to generate the plurality of time-slot symbol vectors, the deinterleaver circuit is configured to:
    generate a first matrix, where each of the plurality of second subcarrier symbol vectors is a column vector of the first matrix;
    generate a second matrix by transposing the first matrix; and
    provide column vectors of the second matrix as the plurality of time-slot symbol vectors associated with the plurality of time-slots respectively.

14. The system of claim 11, wherein the equalization process includes a minimum mean-square error (MMSE) equalization process.

15. The system of claim 11, wherein the demodulation process includes a zero-forcing (ZF) equalization process.

16. The system of claim 11, further comprising:
one or more noise plus interference (NPI) circuits configured to compute a noise plus interference (NPI) variance resulting from the equalization process and the demodulation process; and
a soft output circuit configured to generate a soft-output signal using the NPI variance and the estimates of the data symbols.

17. The system of claim 16, wherein the soft-output signal includes log-likelihood ratio (LLR) values.

18. The system of claim 16, wherein to compute the NPI variance, the one or more noise plus interference (NPI) circuits are configured to:
obtain a first NPI variance resulting from the equalization process; and
multiply a demodulation NPI variance term retrieved from a memory and the first NPI variance to provide the NPI variance.

19. The system of claim 18, further comprising:
a generalized frequency division multiplexing (GFDM) modulator configured to modulate the data symbols to generate a GFDM signal for transmission in the channel, wherein a transmit filter is applied for each sub-carrier using circular convolution.

20. The system of claim 19, wherein the demodulation NPI variance term is expressible as:

$$\frac{1}{KM}\sum_{k=0}^{K-1}\sum_{m=0}^{M-1}|\tilde{g}_{k,m}|^2,$$

wherein K represents a first number of the plurality of subcarriers,
wherein M represents a second number of the plurality of time-slots,
wherein $\tilde{g}_{k,m}$ is chosen such that:
$$F_M\tilde{g}_{k,m}=1/F_M g_{k,m},$$
wherein $F_M$ is an M×M normalized discrete Fourier transform (DFT) matrix, and
wherein $g_{k,m}$ is a component of the transmit filter.

* * * * *